June 1, 1965  L. F. TOUHEY  3,186,734
TRAILER VEHICLE FOR HOUSING A MOTOR VEHICLE
Filed Dec. 17, 1962  3 Sheets-Sheet 2
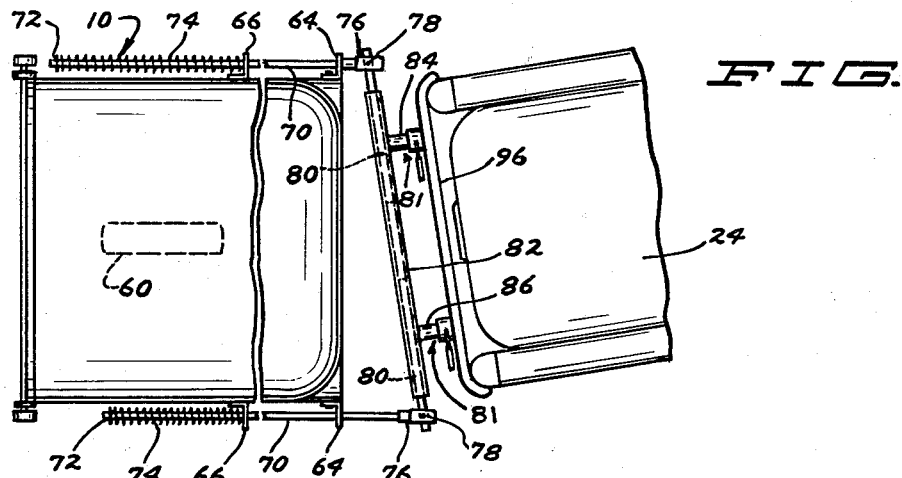
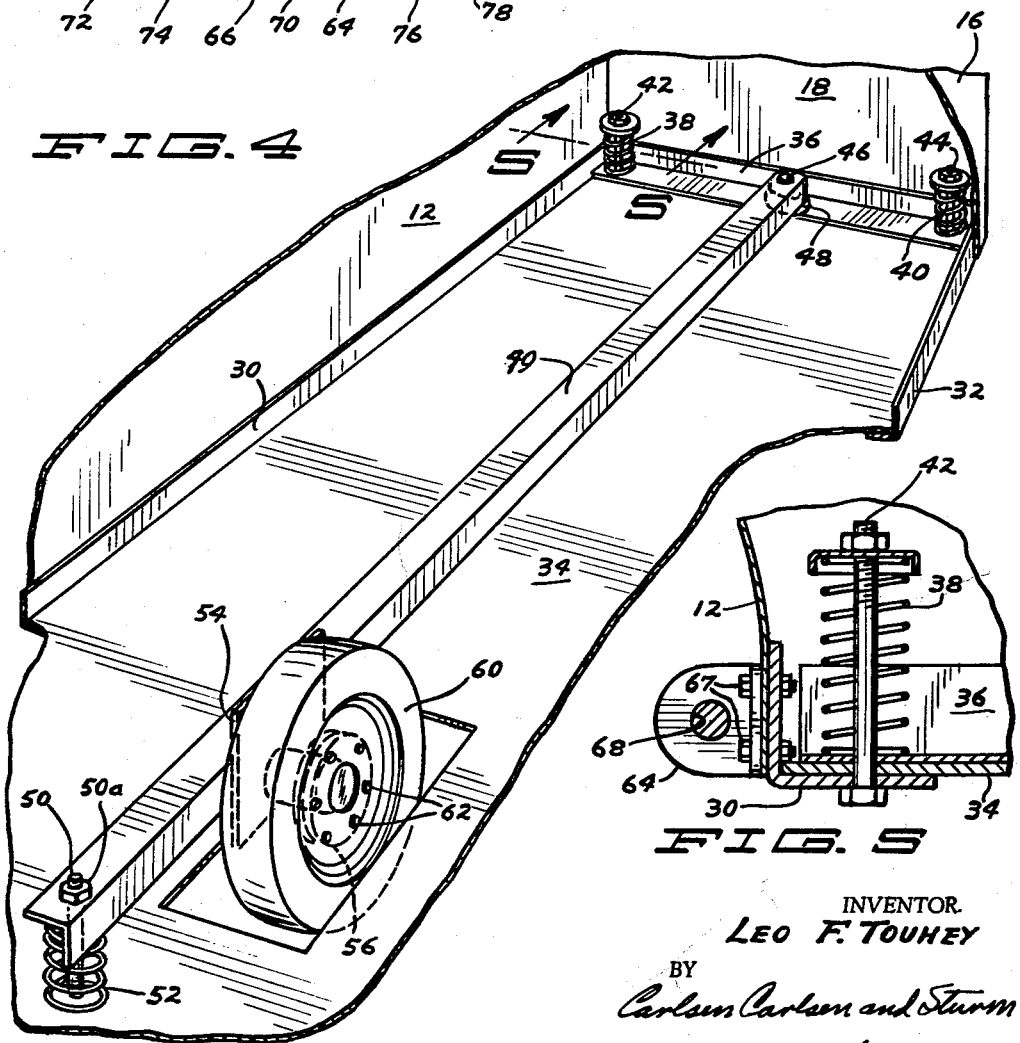
INVENTOR.
LEO F. TOUHEY
BY
Carlsen Carlsen and Sturm
ATTORNEYS June 1, 1965 L. F. TOUHEY 3,186,734
TRAILER VEHICLE FOR HOUSING A MOTOR VEHICLE
Filed Dec. 17, 1962 3 Sheets-Sheet 3
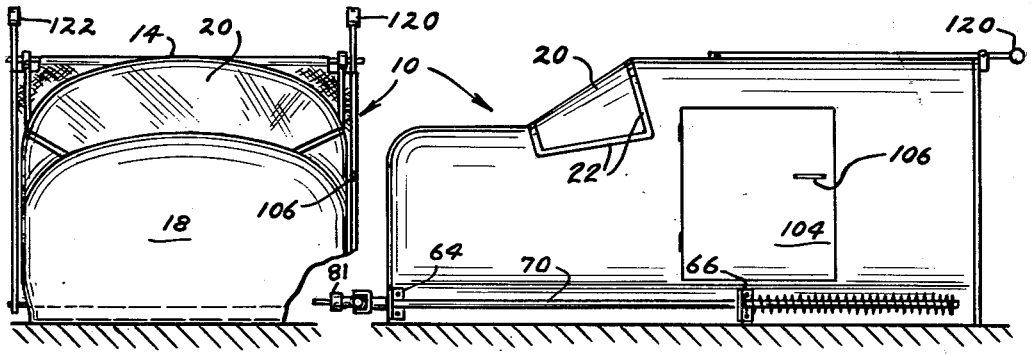
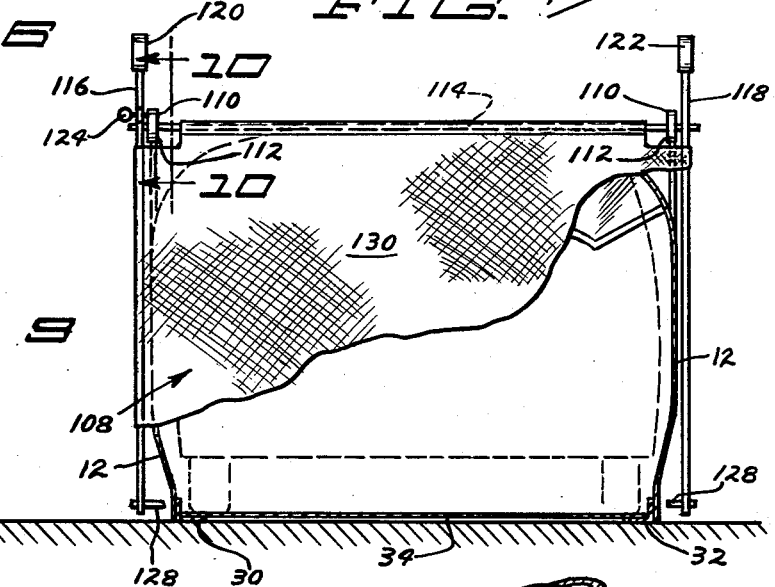
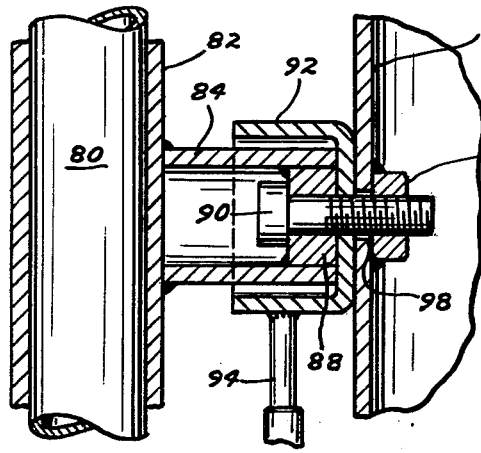
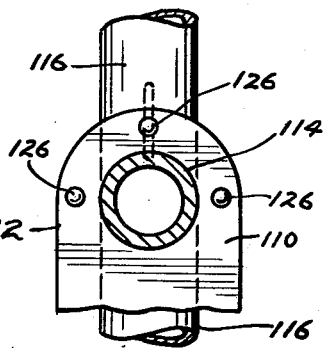
INVENTOR.
LEO F. TOUHEY
BY
ATTORNEYS 3,186,734
TRAILER VEHICLE FOR HOUSING A MOTOR
VEHICLE
Leo F. Touhey, 3610 Dupont Ave. N.,
Minneapolis 12, Minn.
Filed Dec. 17, 1962, Ser. No. 244,978
5 Claims. (Cl. 280—460)

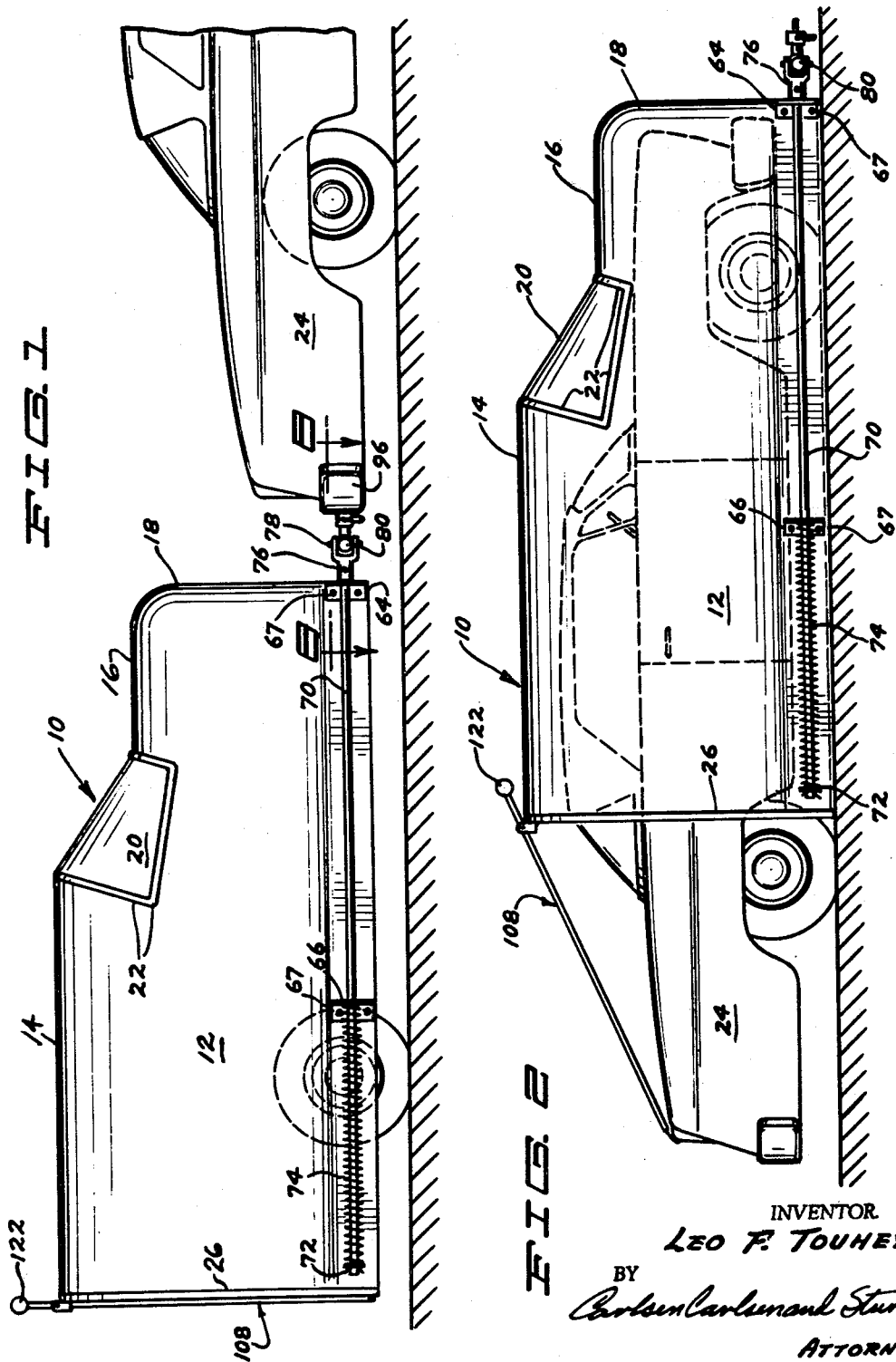

The present invention relates to trailer vehicles. The invention relates particularly to mobile garages and to a hitch construction for a trailer vehicle.

It is one object of the present invention to provide an improved trailer vehicle which is relatively light in weight and consequently inexpensive to manufacture.

Another object of the present invention is the provision of an improved light weight trailer vehicle employing a single ground wheel as, for example, the spare wheel and tire from the motor vehicle which is used to tow the trailer.

Another object of this invention is the provision of an improved trailer vehicle having a single ground wheel and incorporating an improved hitch system for securing the trailer to a motor vehicle.

A further object of the present invention is the provision of an improved trailer vehicle which will function as a protective enclosure or garage for another vehicle such as an automobile.

Still another object of the present invention is the provision of an improved trailer which can be employed as a mobile garage for housing a motor vehicle but which can be made substantially smaller in overall size than the vehicle which is to be housed therein.

These and other more detailed and specific objects will be disclosed in the course of the following specification, reference being had to the accompanying drawings, in which—

FIG. 1 is a partial side elevational view of a trailer vehicle incorporating the present invention as it appears when it is being towed behind a motor vehicle.

FIG. 2 is a side elevational view of the vehicle of FIG. 1 with an automobile housed therein.

FIG. 3 is a partial plan view of the vehicle of FIGS. 1 and 2 as it appears when secured to an automobile.

FIG. 4 is a partial perspective view of the trailer vehicle according to my invention partly broken away.

FIG. 5 is a vertical sectional view taken on lines 5—5 of FIG. 4.

FIG. 6 is a partial front elevational view of the trailer according to my invention.

FIG. 7 is a left-side elevational view of the trailer according to my invention with the rear door in an elevated position.

FIG. 8 is a horizontal sectional view taken on line 8—8 of FIG. 1.

FIG. 9 is a rear elevational view of the apparatus according to my invention partly broken away.

FIG. 10 is a vertical sectional view taken on line 10—10 of FIG. 9.

In the drawings there is shown a trailer vehicle 10 according to my invention including a housing or enclosure having sidewalls 12, an arcuate top wall 14 including a forward portion designated 16 which is somewhat lower than the rearward portion and a front wall 18. The walls 12 through 18 can, if desired, be formed from a single sheet of material such as light weight sheet metal or plastic material of any suitable known construction. Extending between the forward portion 16 of the upper wall 14 and the rearward portion thereof is a window or windshield 20 formed from a transparent material such as a transparent plastic resin. The window 20 is secured to the sidewalls 12 top wall portions 14 and 16 at 22. As seen in FIGS. 1 through 3, a motor vehicle such as an automobile is used to tow the vehicle 10 when it is being transported from one location to another. After the automobile 24 has reached its destination, the trailer vehicle 10 can be used as an enclosure for the automobile 24 as best seen in FIG. 2.

The enclosure comprising the sidewalls 12 and top walls 14 and front wall 18 can be suitably supported wherever it is found necessary by means of structural members such as reinforcing bar 26 which is rigidly connected to the rearward end of the sidewalls 12 and top wall 14. Other reinforcing members of suitable construction can be employed where necessary to provide the required strength.

As can be best seen in FIGS. 4 and 5 a pair of rigid structural members such as L-irons 30 and 32 extend from the front of the vehicle to the rear thereof along the lower edge of each side. The lower edges of the sidewall 12 can be secured to the L-irons 30 and 32 in any suitable manner as by welding. As seen in FIGS. 4 and 5 the one flange of each of the L-irons 30 and 32 project medially beneath a generally rectangular floor member 34 which is supported upon these flanges. The floor 34 is suitably connected to the L-irons 30 and 32 as by bolts or by welding. While various materials will be apparent to those skilled in the art, the floor 34 can be formed from any strong lightweight material such as sheet metal or reinforced plastic. The L-irons 30 and 32 should be given the same spacing as the lateral distance between the wheels or the motor vehicle 24 so that the wheels thereof will rest on the L-irons as shown in dotted lines in FIG. 9.

Extending transversely between the forward ends of the L-irons 30 and 32 is a cross member in the form of an L-iron 36. Springs 38 and 40 are provided at each end of the L-iron 36. Extending vertically through the springs 38 and 40 and connected to the upper ends thereof are a pair of laterally spaced connecting elements such as bolts 42 and 44 which project through suitable aligned openings in the L-irons 30, 32 and 36. Thus, the bolt 42 extends through the forward end of the L-iron 30 and the left end of the L-iron 36 and the bolt 44 extends through the forward end of the L-iron 32 and the right end of the L-iron 36. The springs 38 and 40 thereby yieldably bias the L-iron 36 downwardly against the forward end of the floor 34 and the forward end of L-irons 30 and 36.

Suitably secured to the center of the L-iron 36 is a pivot pin 46. Mounted over the pin 46 is a spacing element such as a cylindrical spool 48. Extending longitudinally through the trailer 10 above the floor 34 is a wheel support member 49 the forward end of which is affixed to the L-iron 36 by means of the pivot member 46. The rearward end of the member 49 is secured to the vehicle 10 by means of a bolt 50 to the lower end of which extends through the floor 34 and the upper end of which extends through the rearward end of the support member 49 and is secured thereto by means of a nut 50a. A resilient member such as a helical spring 52 is mounted between the rearward end of the member 49 and the floor 34 for yieldably connecting the rearward end of the bar 49 to the floor 34.

Rigidly secured to the one side of the member 49 near its rearward end is a wheel support plate 54. Rotatably affixed to the support plate 54 in any suitable manner is a wheel hub 56 which can be seen in FIG. 4. A ground wheel and pneumatic tire 60 is mounted as shown in FIGS. 1 and 4 upon the wheel hub 56 by means of a plurality of circumferentially spaced fasteners 62. While the wheel and pneumatic tire 60 can be of any desired size and construction it is convenient to employ for this purpose the spare tire of the motor vehicle which is used to tow the trailer vehicle 10. As a result, the manufacturing cost of the trailer 10 can be substantially reduced. As shown in FIGS. 1 and 4, a portion of the wheel and pneumatic tire 60 projects downwardly through a suitable opening in the floor 34. The rearward end of the trailer 10 is in this way supported the required distance above the roadway over which it is being towed.

As can be seen in FIGS. 1, 2, 3 and 5 a pair of laterally spaced apart brackets 64 are provided at the forward end of the vehicle 10 and on opposite sides thereof. A pair of similar brackets 66 are provided somewhat rearwardly of the brackets 64. Each of the brackets 64 and 66 is secured to the sidewalls 12 of the vehicle and to the respective L-irons 30 and 32 by means of fasteners such as bolts 67.

Each of the brackets 64 and 66 is bored at 68 to slidably receive a longitudinally extending tow bar 70. The bars 70 are thus slidably mounted at their forward ends upon brackets 64 and at their rearward ends upon brackets 66.

Rigidly connected to the rearward end of each of the bars 70 is a stop member 72 and extending between the stop member 72 and the brackets 66 over each of the bars 70 is a helical spring 74. Each spring 74 is constructed so as to force the adjacent bar 70 rearwardly with respect to the brackets 64 and 66, thereby yieldably biasing the bars 70 toward the rear of the vehicle.

Rigidly mounted upon the forward end of each of the bars 70 is a clevis 76. Pivotally connected to each clevis 76 by means of a pivot pin 78 is a medially extending slide member 80. Each of the members 80 can be polished and suitably lubricated so as to slide freely within a tube 82. Rigidly connected to the tube 82 adjacent the ends thereof are a pair of laterally spaced fasteners 81 (FIG. 3) for attaching the slide tube 82 rigidly to the bumper of the vehicle.

The fasteners 81 include forwardly extending laterally spaced tubes 84 and 86 each rigidly secured to the tube 82. Since each of the fasteners 81 is identical, only one of them will be described in detail.

As best seen in FIG. 8, an end piece 88 is rigidly connected within the forward end of the tube 84 and a bolt 90 extends forwardly through a suitable opening therein. A cap member 92 is rigidly connected to the bolt 90 and handle member 94 is rigidly connected to the cap 92. The bumper 96 of the vehicle 24 is provided with a pair of laterally spaced openings 98. A nut 100 is welded inwardly of each opening 98. When the trailer 10 is to be attached to the motor vehicle 24, the forward end of the bolt 90 is pressed into the opening in the nut 100 and the handle member 94 is then turned so as to securely fasten the bolt 90 into the nut 100.

Referring now particularly to FIGS. 6 and 7 it will be seen that a door 104 is provided in the left-hand sidewall 12 of the vehicle 10. The door 104 is preferably hinged to the sidewall 12 and is provided with a suitable handle or latch 106 of known construction which can be used for opening and closing the door 104 from both the inside and outside thereof. The door 104 should be made in a sufficient size so that the operator of the vehicle 24 will have no difficulty either in entering or emerging from the vehicle 24 after it has been driven into the trailer 10 and parked therein as shown in FIG. 2.

Referring now particularly to FIGS. 7 and 9, it will be seen that a door 108 is provided at the rear of the trailer 10 for closing the end thereof. The rear door 108 is supported upon a pair of laterally spaced apart brackets 110 including journals 112 which project upwardly above the upper wall 14 of the vehicle 10. Each of the journals 112 receives one end of a cross bar 114 as shown in FIGS. 9 and 10. Rigidly connected to the ends of the cross bar 114 outwardly of the brackets 112 are a pair of parallel vertically disposed supporting bars 116 and 118. The ends of the bars 116 and 118 project upwardly a short distance beyond the cross bar 114 and are provided with counterweights 120 and 122.

A retainer means such as a manually removable latch pin 124 is provided between the bar 116 and the adjacent journal 112 for securely retaining the supporting bar 116 and the entire door 108 in the selected position. To this end, the journal 112 is provided with a plurality of circumferentially spaced transverse bores 126 in which the inward end of the pin 124 can be inserted to retain the door 108 in the desired position. An additional bar 128 is rigidly connected between the lower ends of the bars 116 and 118 as best seen in FIG. 9. A suitable lightweight waterproof material such as canvas 130 is affixed on each side to one of the bars 114, 116, 118 and 128 and is stretched therebetween. As best seen in FIG. 2, the door 108 will function to protect the rear of the vehicle 24 when parked within the trailer 10.

When the vehicle 10 is to be moved from one location to another, the ground wheel 60 is taken from the trunk of the vehicle 24 and mounted upon the hub 56. The fasteners at the forward end of the slide bar 82 are then rigidly secured to the bumper 96 of the vehicle 24. When being transported, the trailer 10 can be used for carrying various articles such as luggage.

A trailer according to the present invention was constructed and operated successfully over an extended period of time. It was found to be stable when running and provided a very satisfactory protective enclosure for an automobile. As shwn in FIG. 3, when the vehicle 24 negotiates a turn, one of the springs 74 will become compressed thereby allowing the trailer and motor vehicle 24 to negotiate a turn without casing the wheel 60 to skid across the pavement. It was found that the springs 38, 40 and 52 will provide the required springing for the vehicle 10 and that the vehicle exhibited none of the instability common in many single wheel trailers, in particular, the type in which a single ground wheel is casterably mounted.

Since a rear door 108 will function both as a closure for the rear end of the trailer 10 and also to cover the rear portion of the automobile when it is introduced into the trailer, the trailer need not be made as long as the motor vehicle which is housed therein.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A trailer vehicle comprising in combination a supporting framework including a pair of laterally spaced apart longitudinally extending frame members one such member being positioned on each side of the trailer, a covering including a side, top and front walls, the lower edges of said sidewalls being rigidly connected to said frame members, a floor rigidly connected between said frame members, a cross member connected to the forward end of said longitudinally extending frame members, a longitudinally extending wheel support member pivotally connected at its forward end to the cross member and resiliently connected at its rearward end to said floor member and a ground wheel supporting hub rotatably mounted upon said wheel support member adjacent the rearward end of said trailer vehicle.

2. A trailer vehicle comprising in combination a supporting framework, a pair of laterally spaced longitudinally extending elongate members slidably mounted for movement upon a longitudinal axis on each side of said framework, spring means yieldably biasing each elongate member rearwardly upon the framework, means on the trailer for mounting a single ground wheel near the rearward end thereof, slide members pivotally connected to the forward ends of said elongate members, a slide element extending transversely of the front of said trailer vehicle and slidably mounted upon each of said slide members and a fastener means on said slide element for affixing said slide element rigidly to the rearward end of a second vehicle whereby said trailer vehicle will be able to swing laterally of said second vehicle during the negotiation of turns.

3. The apparatus of claim 2 in which an enclosure adapted to receive at least the forward portion of an automobile is operatively disposed and connected to the supporting framework of the trailer vehicle, the enclosure including front, side and top walls rigidly connected to the supporting framework and extending upwardly therefrom and a door member is connected at the upper rearward end of said enclosure for pivotal movement about a transverse axis and operable to project rearwardly and downwardly from the top of said enclosure over one end of an automobile when said automobile is positioned in said enclosure.

4. The apparatus of claim 3 in which a releasable latch means is operatively connected between the door and the enclosure for releasably locking the door in selected positions.

5. The apparatus of claim 2 in which the means on the trailer for mounting a single ground wheel near the rearward end of the trailer includes a longitudinally elongate member pivotally connected at its forward end to the supporting framework of the trailer, resiliently connected at its rearward end to the supporting framework of the trailer and being adapted to rotatably support a single ground wheel intermediate said forward and rearward ends.

References Cited by the Examiner

UNITED STATES PATENTS

| | | | |
|---|---|---|---|
| 1,306,911 | 6/19 | Kern | 280—460 |
| 1,499,152 | 6/24 | Chandler | 280—460 |
| 2,225,130 | 12/40 | Otto et al. | 280—487 |
| 2,282,324 | 5/42 | Everitt | 20—1.13 |
| 2,500,064 | 3/50 | Foster | 280—460 |
| 2,558,153 | 6/51 | Peterson | 280—460 X |
| 2,687,896 | 8/54 | Kinsman | 296—23 X |
| 2,742,674 | 4/56 | Melder | 20—1.13 |
| 3,103,706 | 9/63 | Dyck | 20—2 X |
| 3,108,820 | 10/63 | Rich | 296—23 X |

FOREIGN PATENTS 86,410  10/55  Norway.

A. HARRY LEVY, *Primary Examiner.*

LEO FRIAGLIA, *Examiner.*